(12) United States Patent
Aoki

(10) Patent No.: US 7,487,668 B2
(45) Date of Patent: Feb. 10, 2009

(54) FIXING STRUCTURE FOR PNEUMATIC TIRE PRESSURE SENSOR, AND TIRE WHEEL WITH PROTECTOR FOR PNEUMATIC TIRE PRESSURE SENSOR

(75) Inventor: Hidekatsu Aoki, Atsugi (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 11/637,015

(22) Filed: Dec. 12, 2006

(65) Prior Publication Data

US 2007/0169545 A1 Jul. 26, 2007

(30) Foreign Application Priority Data

Jan. 20, 2006 (JP) ............................. 2006-011954

(51) Int. Cl.
  *G01M 17/02* (2006.01)
(52) U.S. Cl. ...................................... 73/146; 152/152.1
(58) Field of Classification Search .................. 73/146, 73/146.5; 152/152.1
  See application file for complete search history.

(56) References Cited

U.S. PATENT DOCUMENTS

| 5,844,131 A | 12/1998 | Gabelmann et al. |
| 6,516,660 B1 * | 2/2003 | Koch et al. .................. 73/146.5 |
| 2004/0103965 A1 * | 6/2004 | Luce ........................ 152/152.1 |

FOREIGN PATENT DOCUMENTS

| FR | 2 661 373 A1 | 10/1991 |
| JP | 2004-317198 A | 11/2004 |

* cited by examiner

Primary Examiner—Andre J Allen
(74) Attorney, Agent, or Firm—Foley & Lardner LLP

(57) ABSTRACT

A rim (1) of a tire wheel (TW) comprises a drum (1a) and inboard and outboard tire bead sheets (1b, 1c) extending radially from both sides of the drum (1a). A bead portion (3a) of a pneumatic tire (3) is press bonded to the outboard tire bead sheet (1b). A pneumatic tire pressure sensor (2) is fixed to the rim (1). When the pneumatic tire (3) is mounted on the tire wheel (TW), or when the pneumatic tire (3) is removed from the tire wheel (TW), a protector (4) which is fixed to the rim (1) protects the pneumatic tire pressure sensor (2) such that the bead portion (3a) removed from the outboard tire bead sheet (1b) does not interfere with the pneumatic tire pressure sensor (2).

22 Claims, 4 Drawing Sheets

FIXING STRUCTURE FOR PNEUMATIC TIRE PRESSURE SENSOR, AND TIRE WHEEL WITH PROTECTOR FOR PNEUMATIC TIRE PRESSURE SENSOR

FIELD OF THE INVENTION

This invention relates to the fixing of a pneumatic tire pressure sensor for detecting the air pressure of a vehicle pneumatic tire, onto a tire wheel.

BACKGROUND OF THE INVENTION

JP2004-317198A published by the Japan Patent Office in 2004 teaches a fixing structure for a pneumatic tire pressure sensor that detects the air pressure of a vehicle pneumatic tire. According to this prior art, an outer shape of the pneumatic tire pressure sensor is adapted to fit a rim of the vehicle tire wheel such that it is fixed onto a part of the rim using an adhesive agent.

SUMMARY OF THE INVENTION

When the pneumatic tire is in operation, bead portions of a pneumatic tire which are formed in parallel with each other at inner circumferential edges of the pneumatic tire are pressure bonded respectively to inboard and outboard bead sheets formed on the rim of the tire wheel.

When mounting the pneumatic tire onto the tire wheel or removing the pneumatic tire from the tire wheel, the bead portions of the pneumatic tire become separated from the bead sheets and may interfere with the pneumatic tire pressure sensor. As a result, the pneumatic tire pressure sensor may be ripped away from the rim or become damaged.

It is therefore an object of this invention to protect the pneumatic tire pressure sensor during a mounting operation for mounting a pneumatic tire on the tire wheel or a removing operation for removing the same from the tire wheel.

It is a further object of this invention to provide a tire wheel having a function for protecting a pneumatic tire pressure sensor.

In order to achieve the above objects, this invention provides a fixing structure for fixing a pneumatic tire pressure sensor onto a rim of a tire wheel, on which a pneumatic tire is mounted, comprising a protector which is fixed to the rim in the vicinity of the pneumatic tire pressure sensor and protects the pneumatic tire pressure sensor from interference with the pneumatic tire.

This invention also provides a tire wheel comprising a rim on which a pneumatic tire and a pneumatic tire pressure sensor are installed, and a protector which is fixed to the rim in the vicinity of the pneumatic tire pressure sensor and protects the pneumatic tire pressure sensor from interference with the pneumatic tire.

The details as well as other features and advantages of this invention are set forth in the remainder of the specification and are shown in the accompanying drawings.

DESCRIPTION OF THE PREFERRED EMBODIMENTS

Figure 1:
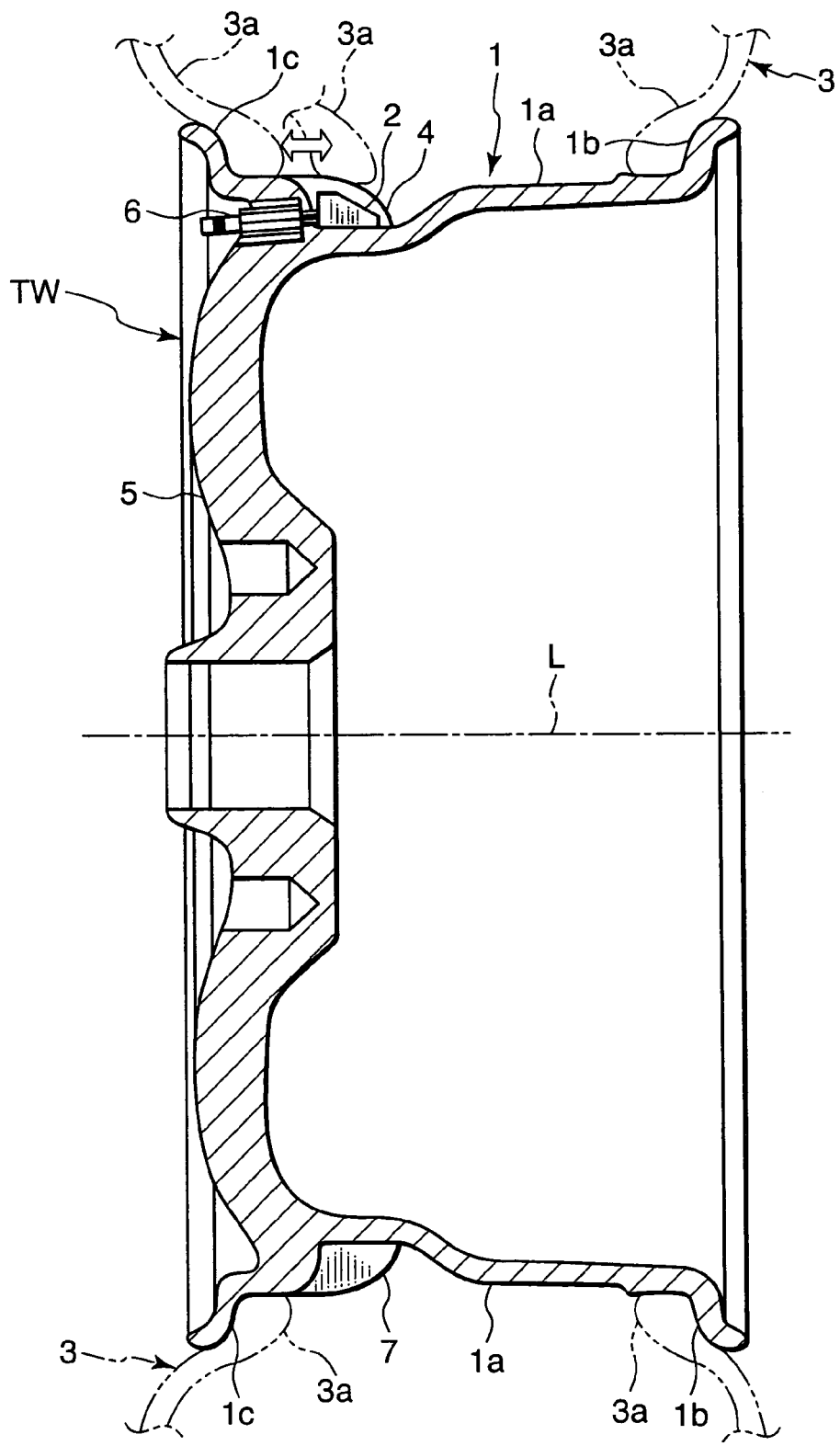
FIG. 1 is a sectional view of a tire wheel taken along a center line L of the tire wheel showing a fixing structure for a pneumatic tire pressure sensor according to this invention.

Referring to FIG. 1 of the drawings, a tire wheel TW for a vehicle comprises a wheel disc 5 and a rim 1 extending laterally from the outer periphery of the wheel disc 5. The wheel disc 5 is fixed to an axle hub by several nuts. The rim 1 comprises a drum 1a, and inboard and outboard bead sheets 1b, 1c extending radially from both side faces of the drum 1a.

A pneumatic tire 3 is mounted on the rim 1 and then pressurized via an air valve 6. The pneumatic tire 3 comprises a pair of bead portions 3a formed at inner circumferential edges of the pneumatic tire 3. When pressurized, the pneumatic tire 3 on the rim 1 covers the drum 1a and pressure bonds the bead portions 3a onto the inboard and outboard bead sheets 1b, 1c of the rim 1 from within the rim 1.

Figure 2:
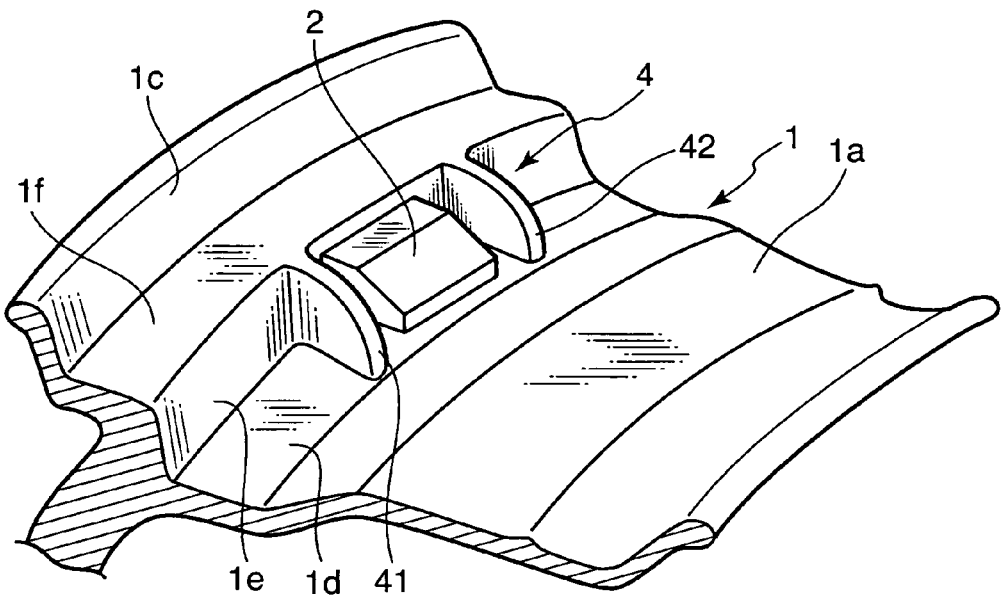
FIG. 2 is a perspective view of essential parts of the tire wheel showing the fixing structure for the pneumatic tire pressure sensor.

Referring to FIG. 2, the drum 1a comprises a first cylindrical part 1d, an annular wall part 1e which extends radially from an outboard edge of the first cylindrical part 1d, and a second cylindrical part 1f which connects the annular wall part 1e to the outboard bead sheet 1c.

For the purpose of detecting an internal air pressure of the pneumatic tire 3, a pneumatic tire pressure sensor 2 is fixed in advance onto the first cylindrical part 1d of the drum 1a via an adhesive agent in a predetermined position, preferably in contact with the annular wall part 1e.

The pneumatic tire pressure sensor 2 comprises a pressure sensor part which detects an air pressure within the pneumatic tire 3, a battery serving as a power source, a centrifugal switch for triggering data output, a transmitter provided with a coil antenna, and an application specific integrated circuit (ASIC) or in other words a so-called custom IC to control the transmitter. The pneumatic tire pressure sensor 2 further comprises a temperature sensor for detecting a temperature of the pneumatic tire 3.

Since the battery has a relatively short life it is also possible to use a batteryless sensor which can transmit signals without battery power. Such a sensor composition is realized by replacing a receiver with a transceiver and replacing the transmitter with a transponder, and by arranging the transceiver to output signals using energy provided by received signals.

Referring again to FIG. 1, the pneumatic tire pressure sensor 2 is assembled together with the air valve 6 through which the pneumatic tire 3 is pressurized or depressurized, and the two components are covered in a resin.

When the pneumatic tire 3 is mounted on the tire wheel TW or removed from the tire wheel TW, the bead portions 3a are removed from the inboard and outboard bead sheets 1b, 1c. In order to prevent the bead portions 3a from ripping the pneumatic tire pressure sensor 2 away from the rim or damaging the sensor 2 by interfering with the sensor 2, a protector 4 is provided.

The protector 4 comprises a pair of wall members 41, 42 disposed on both sides of the pneumatic tire pressure sensor 2 with respect to the rotation direction of the tire wheel TW. The wall members 41, 42 are respectively formed in the shape of a substantially right triangle of which one of the sides subtending the right angle is fixed to the first cylindrical part 1d and the other side is fixed to the annular wall part 1e.

According to this embodiment, further, the hypotenuse bulges outward so as to increase a protection volume. The wall members 41, 42 are formed integrally with the rim 1 in advance.

Figure 3A:
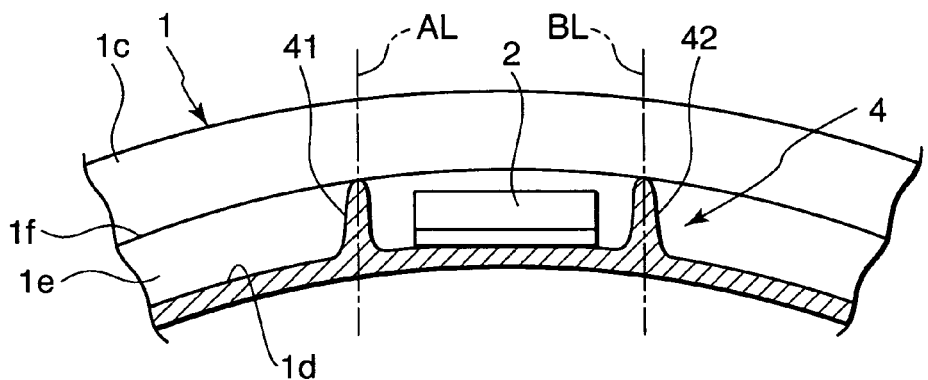
FIGS. 3A and 3B are a sectional view of essential parts of the tire wheel which is taken perpendicular to the center line L of the tire wheel and shows the fixing structure for the pneumatic tire pressure sensor, and an enlarged sectional view of a protector according to this invention.
Figure 3B:
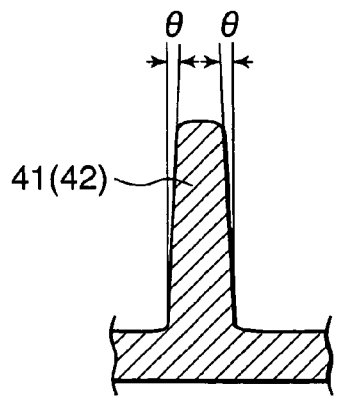

Referring to FIGS. 3A and 3B, the cross-section of the wall members 41, 42 in the rotation direction of the tire wheel TW take a tapered shape such that the thickness thereof decreases as a distance from the first cylindrical part 1d increases. The taper angle θ is set at 8 degrees, for example, as shown in FIG. 3B.

Figure 4:
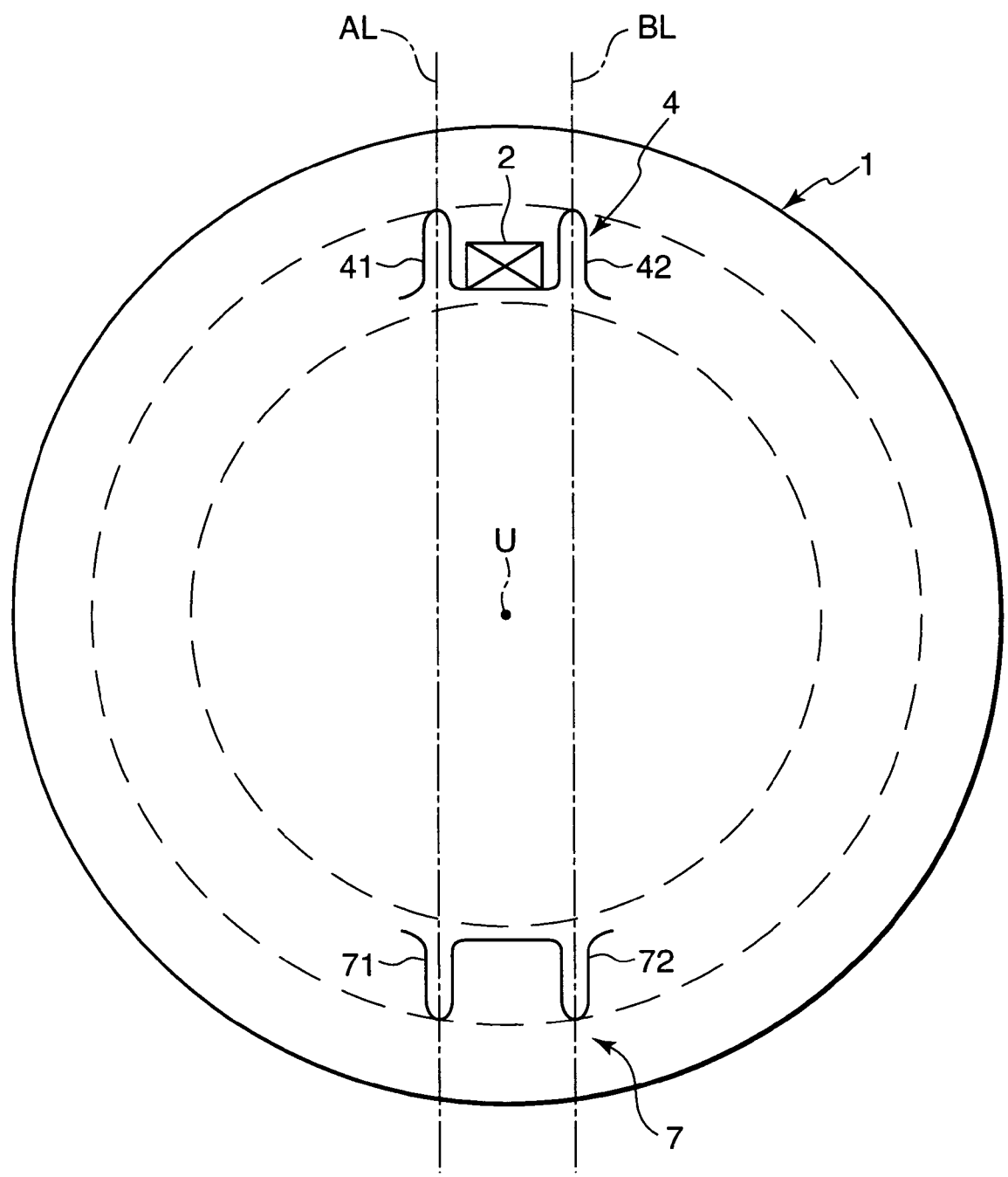
FIG. 4 is a schematic diagram of the tire wheel showing the locations of the protector and a dummy protector according to this invention.

Referring to FIG. 4, a dummy protector 7 is formed on the rim 1 on the opposite side of the center line L of the tire wheel TW to the protector 4, or in a position 180 degrees rotated from the protector 4. The dummy protector 7 comprises similar wall members 71, 72 to the wall members 41, 42. The dummy protector 7 is formed in consideration of the rational balance of the tire wheel TW and acts as a counter balance to the protector 4. The shape and material of the wall members 71, 72 are therefore identical to those of the wall members 41, 42.

The wall members 41 and 72, and the wall members 42 and 72 are aligned respectively on two parallel lines AL and BL when viewed from the wheel axis of the tire wheel TW, or in a direction along the center line L in FIG. 1. The reason why the wall members 41 and 72, and the wall members 42 and 72 are aligned respectively on the two parallel lines AL and BL is to enable removal of a mold after forming the wall members 41, 42, 71, 72 integrally with the tire wheel TW by molding. If the wall members 41, 42, 71, 72 were formed radially, it would not be possible to remove the mold. Making the cross-sectional shape of the wall members 41, 42, 71, 72 tapered is also for convenience when removing the mold.

When the pneumatic tire pressure sensor 2 is installed in the tire wheel TW, the assembly comprising the pneumatic tire pressure sensor 2 and the air valve 6 is inserted into a space between the wall members 41, 42 from the inside of the outboard tire bead sheet 1c such that the air valve 6 penetrates a hole formed in the annular wall part 1e and projects outward as shown in FIG. 1. The installation of the pneumatic tire pressure sensor 2 and the air valve 6 is therefore not difficult.

The pneumatic tire pressure sensor 2 thus disposed between the wall members 41, 42, is prevented from coming into direct contact with the pneumatic tire 3. When the pneumatic tire 3 is mounted on the tire wheel TW or removed from the tire wheel TW, the outboard beam portion 3a of the pneumatic tire 3 displaces along the hypotenuse of the wall members 41, 42 and does not interfere with the pneumatic tire pressure sensor 2.

Further, by making the shape of the wall members 41, 42 into a triangular or bulged triangular shape, the outboard beam portion 3a displaces more smoothly than when the wall members 41, 42 are formed in a rectangular shape. The protector 4 therefore does not cause any trouble when mounting the pneumatic tire 3 on the tire wheel TW or removing the pneumatic tire 3 from the tire wheel TW.

Figure 5:
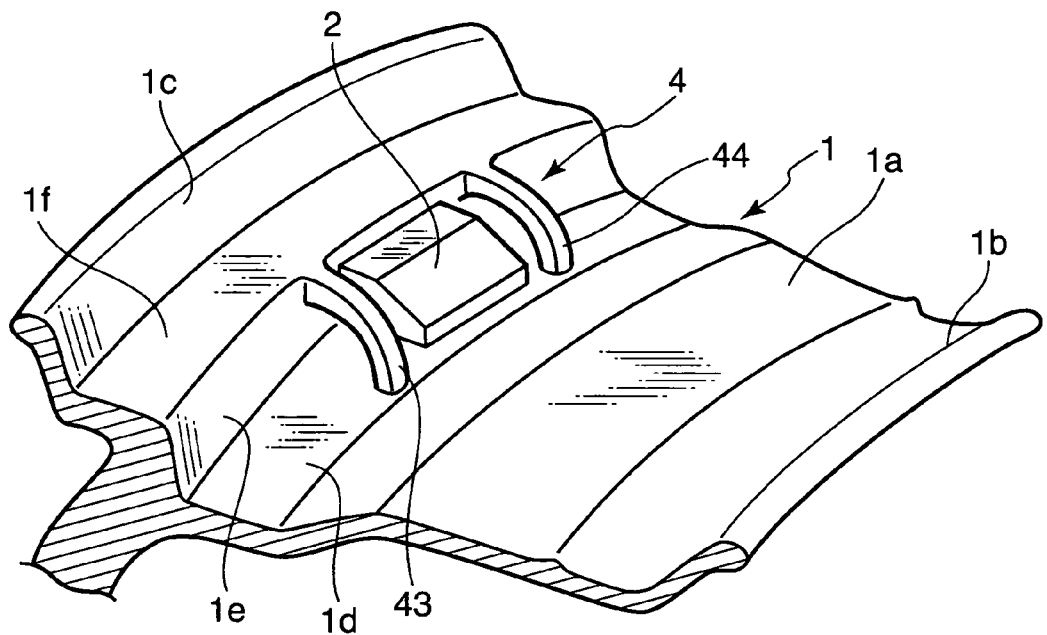
FIG. 5 is similar to FIG. 2 but shows a second embodiment of this invention.

Next, referring to FIG. 5, a second embodiment of this invention will be described.

According to this invention, the protector 4 comprises arc-shaped arm members 43, 44 disposed parallel with each other instead of the wall members 41, 42 of the first embodiment. The locations of the arm members 43, 44 are identical to those of the wall members 41, 42, of the first embodiment.

The arm members 43, 44 are lighter in weight than the wall members 41, 42 of the first embodiment, and hence the effect on the rotational balance of the tire wheel TW which the arm members 43, 44 bring about is smaller than that of the wall members 41, 42. Therefore, the dummy protector 7 may not be necessary in this embodiment.

Figure 6:
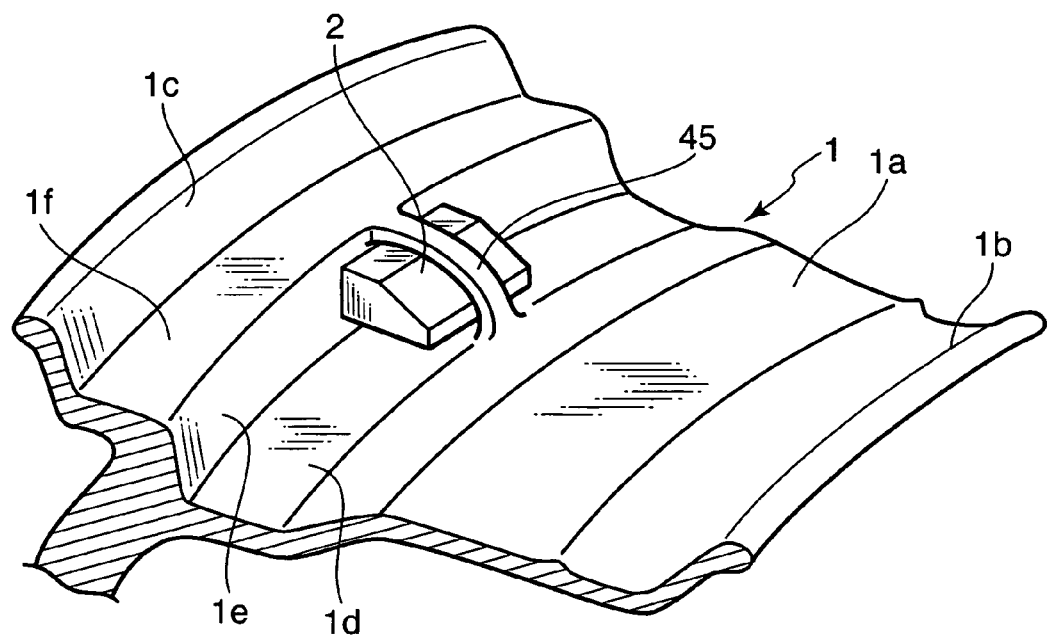
FIG. 6 is similar to FIG. 2 but shows a third embodiment of this invention.

Referring to FIG. 6, a third embodiment of this invention will be described.

According to this embodiment, the protector 4 comprises a single arm 45 instead of the arm members 43, 44 of the second embodiment. The arm member 45 is arranged to straddle the pneumatic tire pressure sensor 2. The dimensions of the arm member 45 are therefore made slightly larger than those of the arm members 43, 44 so as to be able to accommodate the pneumatic tire pressure sensor 2 in a space delimited by the arm member 45, the first cylindrical part 1d and the annular wall part 1e.

According to this embodiment, since the single arm member 45 constitutes the protector 4, the weight of the protector 4 can be reduced even further than that of the second embodiment. The effect of the protector 4 on the rotational balance of the tire wheel 3 is therefore made even smaller than that of the second embodiment, and hence the dummy protector 7 is even less necessary than in the second embodiment.

The contents of Tokugan 2006-011954, with a filing date of Jan. 20, 2006 in Japan, are hereby incorporated by reference.

Although the invention has been described above with reference to certain embodiments of the invention, the invention is not limited to the embodiments described above. Modifications and variations of the embodiments described above will occur to those skilled in the art, within the scope of the claims.

For example, the shape of the members constituting the protector 4 is not limited to a triangular or arc-shape. The shape of the wall or arm members may be designed arbitrarily depending on the shape of the rim 1 and the outer shape of the pneumatic tire pressure sensor 2, which is the object of the protection.

Instead of molding the protector 4 and dummy protector 7 integrally with the tire wheel TW, the protector 4 and dummy protector 7 may be manufactured independently and then fixed to the tire wheel TW by welding.

The material of the protector 4 and the dummy protector 7 is not limited as long as the protector 4 and the dummy protector 7 can be fixed onto the tire wheel TW.

In the embodiments described above, the pneumatic tire pressure sensor 2 is fixed onto the first cylindrical part 1d, but it may be fixed to the annular wall part 1e, or even to the protector 4.

The embodiments described above illustrate a case where this invention is applied to the tire wheel TW in which the rim 1 and the disk 5 are manufactured integrally, but this invention can be applied to a tire wheel in which the rim and the disk are manufactured separately and then integrated by welding.

In the embodiments described above, the pneumatic tire pressure sensor 2 is assembled together with the air valve 6, but this invention can be applied to protect a pneumatic tire pressure sensor that is provided independently of the air valve 6.

The embodiments of this invention in which an exclusive property or privilege is claimed are defined as follows:

What is claimed is:

1. A fixing structure for fixing a pneumatic tire pressure sensor onto a rim of a tire wheel, on which a pneumatic tire is mounted, comprising:

a protector fixed to the rim in the vicinity of the pneumatic tire pressure sensor to protect the pneumatic tire pressure sensor from interference with the pneumatic tire, wherein the pneumatic tire comprises bead portions, wherein the rim comprises a drum and inboard and outboard tire bead sheets extending radially from both sides of the drum, wherein the bead portions of the pneumatic tire are press bonded to the inboard and outboard tire bead sheets, respectively, wherein the drum comprises a first cylindrical part, an annular wall part extending radially from an outboard edge of the first cylindrical part, and a second cylindrical part which connects the annular wall part to the outboard tire bead sheet, and wherein the protector is fixed to the first cylindrical part and the annular wall part in the vicinity of the pneumatic tire pressure sensor.

2. The fixing structure for a pneumatic tire pressure sensor as defined in claim 1, wherein the protector comprises a pair of protecting members disposed on both sides of the pneumatic tire pressure sensor with respect to a rotation direction of the tire wheel.

3. The fixing structure for a pneumatic tire pressure sensor as defined in claim 2, wherein the pair of protecting members comprises a pair of wall members respectively formed in a shape of a substantially right triangle.

4. The fixing structure for a pneumatic tire pressure sensor as defined in claim 3, wherein a hypotenuse of the right triangle is formed to bulge outward.

5. The fixing structure for a pneumatic tire pressure sensor as defined in claim 3, wherein the pair of wall members are aligned on two parallel straight lines when viewed in a direction along a center line of the tire wheel.

6. The fixing structure for a pneumatic tire pressure sensor as defined in claim 5, wherein the pair of wall members are formed to have a dimension in a radial direction of the tire wheel which gradually reduces as a distance from the first cylindrical part increases.

7. The fixing structure for a pneumatic tire pressure sensor as defined in claim 2, wherein the pair of protecting members comprises a pair of arc-shaped arm members.

8. The fixing structure for a pneumatic tire pressure sensor as defined in claim 1, wherein the protector comprises an arc-shaped arm member which straddles the pneumatic tire pressure sensor.

9. The fixing structure for a pneumatic tire pressure sensor as defined in claim 1, further comprising a dummy protector fixed to the rim on an opposite side of a center line of the tire wheel to the protector.

10. The fixing structure for a pneumatic tire pressure sensor as defined in claim 1, wherein the protector is molded integrally with the rim.

11. The fixing structure for a pneumatic tire pressure sensor as defined in claim 1, wherein the pneumatic tire pressure sensor is provided integrally with an air valve used for pressurizing and depressurizing the pneumatic tire.

12. A tire wheel comprising:

a rim on which a pneumatic tire and a pneumatic tire pressure sensor are installed, wherein the pneumatic tire comprises bead portions, wherein the rim comprises a drum and inboard and outboard tire bead sheets extending radially from both sides of the drum, wherein the bead portions of the pneumatic tire are press bonded to the inboard and outboard tire bead sheets, respectively, wherein the drum comprises a first cylindrical part, an annular wall part extending radially from an outboard edge of the first cylindrical part, and a second cylindrical part which connects the annular wall part to the outboard tire bead sheet; and a protector fixed to the first cylindrical part and the annular wall part in the vicinity of the pneumatic tire pressure sensor to protect the pneumatic tire pressure sensor from interference with the pneumatic tire.

13. The tire wheel as defined in claim 12, wherein the protector comprises a pair of protecting members disposed on both sides of the pneumatic tire pressure sensor with respect to a rotation direction of the tire wheel.

14. The tire wheel as defined in claim 13, wherein the pair of the protecting members comprises a pair of wall members respectively formed in a shape of a substantially right triangle.

15. The tire wheel as defined in claim 14, wherein a hypotenuse of the right triangle is formed to bulge outward.

16. The tire wheel as defined in claim 14, wherein the pair of wall members are aligned on two parallel straight lines when viewed in a direction along a center line of the tire wheel.

17. The tire wheel as defined in claim 16, wherein the pair of wall members are formed to have a dimension in a radial direction of the tire wheel which gradually decreases as a distance from the first cylindrical part increases.

18. The tire wheel as defined in claim 13, wherein the pair of protecting members comprises a pair of arc-shaped arm members.

19. The tire wheel as defined in claim 12, wherein the protector comprises an arc-shaped arm member which straddles the pneumatic tire pressure sensor.

20. The tire wheel as defined in claim 12, further comprising a dummy protector fixed to the rim on an opposite side of a center line of the tire wheel to the protector.

21. The tire wheel as defined in claim 12, wherein the protector is molded integrally with the rim.

22. The tire wheel as defined in claim 12, wherein the pneumatic tire pressure sensor is provided integrally with an air valve used for pressurizing and depressurizing the pneumatic tire.

* * * * *